(12) United States Patent
Gupta et al.

(10) Patent No.: US 6,957,019 B2
(45) Date of Patent: Oct. 18, 2005

(54) STABILIZED OPTICAL PULSE GENERATOR

(75) Inventors: Kamal Kant Gupta, Kobe Hyogo (JP); Noriaki Onodera, Yokosuka Kanagawa (JP)

(73) Assignee: National Institute of Information and Communications Technology, Tokyo (JP)

( * ) Notice: Subject to any disclaimer, the term of this patent is extended or adjusted under 35 U.S.C. 154(b) by 272 days.

(21) Appl. No.: 10/147,986

(22) Filed: May 20, 2002

(65) Prior Publication Data

US 2003/0063837 A1 Apr. 3, 2003

(30) Foreign Application Priority Data

Oct. 2, 2001 (JP) ........................................ 2001-306952

(51) Int. Cl.[7] .......................... H01J 14/08; G02F 1/035; H04B 10/04
(52) U.S. Cl. .............................. 398/95; 385/3; 398/183
(58) Field of Search .......................... 398/95, 183, 187, 398/188, 189, 198; 359/245, 278, 237; 385/1–3

(56) References Cited

U.S. PATENT DOCUMENTS 5,646,774 A * 7/1997 Takara et al. ................ 359/340
6,101,021 A * 8/2000 Kumagai et al. ............ 359/237
6,493,125 B1 * 12/2002 Tanaka et al. ................. 398/95

OTHER PUBLICATIONS

K.K. Gupta et al., "Technique to generate equal amplitude, higher–order optical pulses in rational harmonically mode locked fibre ring lasers", Electronics Letters Jul. 19, 2001 vol. 37 No. 15, pp. 948–950.

K.K. Gupta, et al., "Pulse Amplitude Equalisation in Rational Harmonically Mode–Locked Fibre Ring Lasers", APPCC2001 Proceedings of the 7th Asia–Pacific Conference on Communications, Sep. 17–20, 2001, pp. 109–112.

K.K. Gupta, et al. "Pulse Repetition Frequency Multoplication via Intra–Cavity Optical Filtering in AM Mode Locked Eing Lasers" IEEE Photonics Technology Letters, Mar. 2002, pp. 1–14.

D. Von der Linde, "Characterisation of the Noise in Continuously Operating Mode–Locked Lasers," *Applied Physics B—Photophysics and Laser Chemistry*, vol. 39, pp. 201–217, 1986.

(Continued)

*Primary Examiner*—Joseph Williams
*Assistant Examiner*—Peter Macchiarolo

(57) ABSTRACT

A stabilized optical pulse generator using RHML-FRL is provided. The stabilized optical pulse generator comprises an optical fiber ring composed of optical fibers, an optical amplifier and a modulator for optical modulation, an electric signal generator generating high frequency signals and an optical pulse stabilizer. The device generates an optical pulse train of repeating frequency of $f_m$, when applying electric signals of frequency of $f_m$ to the modulator. Wherein, for a resonance frequency of the optical fibers of $f_c$, the modulating frequency applying to the modulator is detuned from the electric signal of the frequency of $f_m$ by frequency of the resonance frequency $f_c$ divided by integer of p. Optical pulse trains of repeating frequency of p times of $f_m+f_c/p$ or $f_m-f_c/p$ are generated. The optical pulse trains are stabilized by suppressing carrier components and a part of high frequency components as well as suppressing the random oscillations of the cavity resonance modes and intermediate longitudinal modes with respect to the main longitudinal modes which are frequency spaced that is equal to the repetition frequency of the generated optical pulse trains.

24 Claims, 15 Drawing Sheets

FIG. 5B

OTHER PUBLICATIONS

M. Nakazawa, T. Yamamoto, and K.R. Tamura "1.28 Tbit/s 70km OTDM Transmission Using Third–and Fourth–Order Simultaneous Dispersion Compensation With a Phase Modulator," *Electronics Letters*, vol. 36, No. 24, pp. 2027–2029, 2000.

Th. Pfeiffer and G. Veith, "40 GHz Pulse Generation Using a Widely Tunable All–Polarisation Preserving Erbium Fibre Ring Laser," *Electronic Letters*, vol. 29, pp. 1849–1850, 1993.

M.Y. Jeon, H.K. Lee, J.T. Ahn, D.S. Lim, H.Y. Kim, K.H. Kim, and E.H. Lee, "External Fibre Laser Based Pulse Amplitude Equalisation Scheme for Rational Harmonic Modelocking in a Ring–Type Fibre Laser," *Electronics Letters*, vol. 34, pp. 182–184, 1998.

J.J. O'Reilly and P.M. Lane, "Fibre–supported Optical Generation and Delivery of 60 GHz Signals," *Electronic Letters*, vol. 30, pp. 1329–1330, 1994.

K.K. Gupta and D. Novak, "Millimetre–wave Repetition–rate Optical Pulse Train Generation in Harmonically Modelocked Fibre Ring Laser," *Electronic Letters*, vol. 33, pp. 1330–1331, Jul. 1997.

J.J. O'Reilly and P.M. Lane, R. Heideman, and R. Hofstetter, "Optical Generation of Very Narrow Linewidth Millimetre Wave Signal," *Electronic Letters*, vol. 28, No. 25, pp. 2309–2311, Dec. 1992.

N. Onodera, "Supermode Beat Suppression in Harmonically Mode–Locked Erbium–Doped Fibre Ring Lasers with Composite Cavity Structure," *Electronic Letters*, vol. 33, No. 11, pp. 962–963, May, 1997.

S. Kawanishi, H. Takara, K. Uchiyama, I. Shake and K. Mori, "3 Tbit/s (160 Gbit/s×19 channel) Optical TDM and WDM Transmission Experiment," *Electronic Letters*, vol. 35, No. 10, pp. 826–827, May, 1999.

Z. Ahmed and N. Onodera, "High Repetition Rate Optical Pllse Generation by Frequency Multiplication in Actively Modelocked Fibre Ring Lasers," *Electronic Letters*, vol. 32, No. 5, pp. 455–457, Feb., 1996.

K.S. Abedin, M. Hyodo and N. Onodera, "154 GHz Polarisation–Maintaining Dispersion–Managed Actively Modelocked Fibre Ring Laser," *Electronic Letters*, vol. 36, No. 14, pp. 1185–1186, Jul., 2000.

K.K. Gupta, N. Onodera and M. Hyodo, "Technique to generate Equal Amplitude Higher–Order Optical Pulses in Rational Harmonically Modelocked Fibre Ring Lasers," *Electronic Letters*, vol. 37, No. 15, pp. 948–950, Jul., 2001.

K.K. Gupta, N. Onodera and M. Hyodo, "Pulse Amplitude Equalisation in Rational Harmonically Mode–Locked Fibre Ring Lasers," The 7th Asia–Pacific Conference on Communications, vol. E84–B, No. 11 Appendix, pp. 109–112, Sep., 2001.

K.K. Gupta, N. Onodera, M. Hyodo and K.S. Abedin, "Pulse Repetition Frequency Multiplication via Intra–Cavity Optical Filtering in AM Mode–Locked Fibre Ring Lasers," *IEEE Photonics Technology Letters*, Mar., 2002, pp. 1–14.

* cited by examiner

RELATION OF BIAS VOLTAGE AND OUTPUT OF
A MACH-ZEHNDER OPTICAL INTENSITY MODULATOR

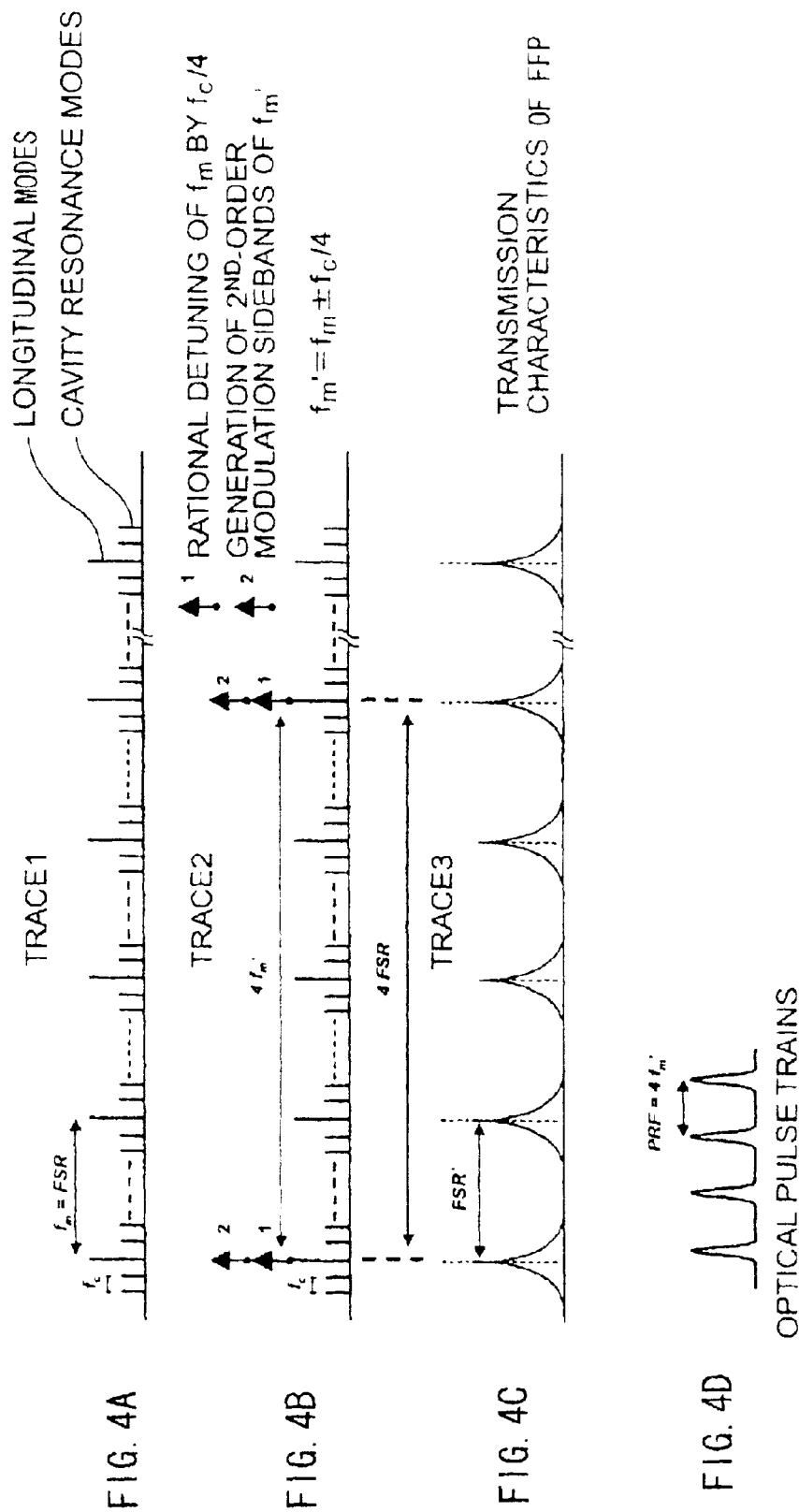

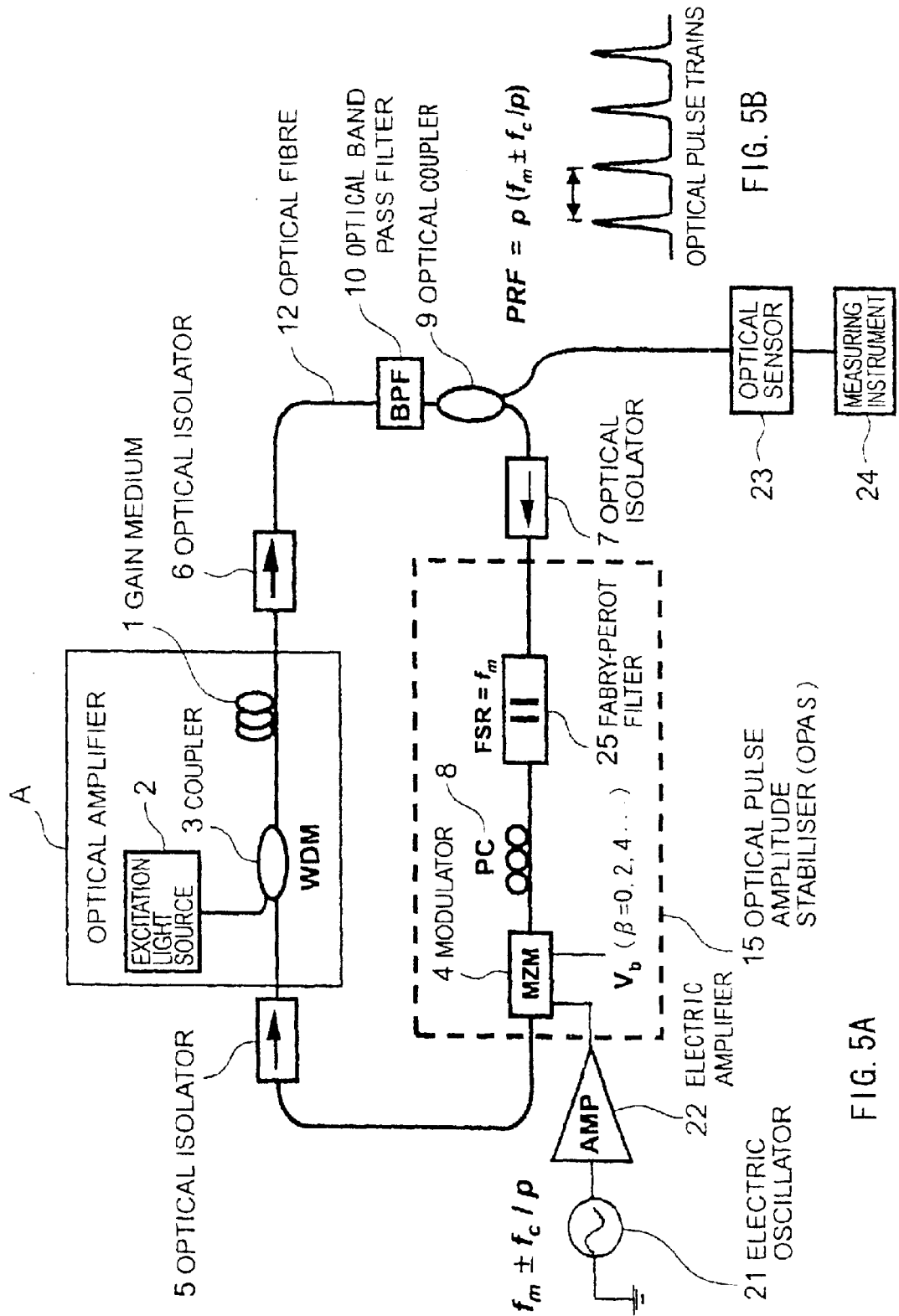

FROM CONVENTIONAL RHML-FRL
WITHOUT THE PRESENT INVENTION

FROM CONVENTIONAL RHML-FRL
WITHOUT THE PRESENT INVENTION

FROM CONVENTIONAL RHML-FRL
WITHOUT THE PRESENT INVENTION

FROM CONVENTIONAL RHML-FRL
WITHOUT THE PRESENT INVENTION

FROM RHML-FRL IMPLEMENTING
THE PRESENT INVENTION

FROM RHML-FRL IMPLEMENTING
THE PRESENT INVENTION

OPTICAL PULSE SPECTRUM TRAIN FROM RHML-FRL
IMPLEMENTING THE PRESENT INVENTION

AUTOCORRELATION PULSE PROFILE OF OPTICAL PULSES
FROM RHML-FRL IMPLEMENTING THE PRESENT INVENTION

RELATIONS BETWEEN WAVELENGTH AND PULSE WIDTH
AND BETWEEN WAVELENGTH AND TIME-BAND WIDTH PRODUCT
IN THE GENERATED OPTICAL PULSE TRAINS FROM THE RHML-FRL
IMPLEMENTING THE PRESENT INVENTION

FROM CONVENTIONAL RHML-FRL
WITHOUT PRESENT INVENTION

FROM RHML-FRL IMPLEMENTING PRESENT INVENTION

FROM CONVENTIONAL RHML-FRL
WITHOUT PRESENT INVENTION

FROM RHML-FRL IMPLEMENTING PRESENT INVENTION

FREQUENCY OFFSET (Hz)
CHARACTERISTICS OF 13.91 GHz
PHASE NOISE PULSE TRAINS OBTAINED FROM RHML-FRL
IMPLEMENTING THE PRESENT INVENTION

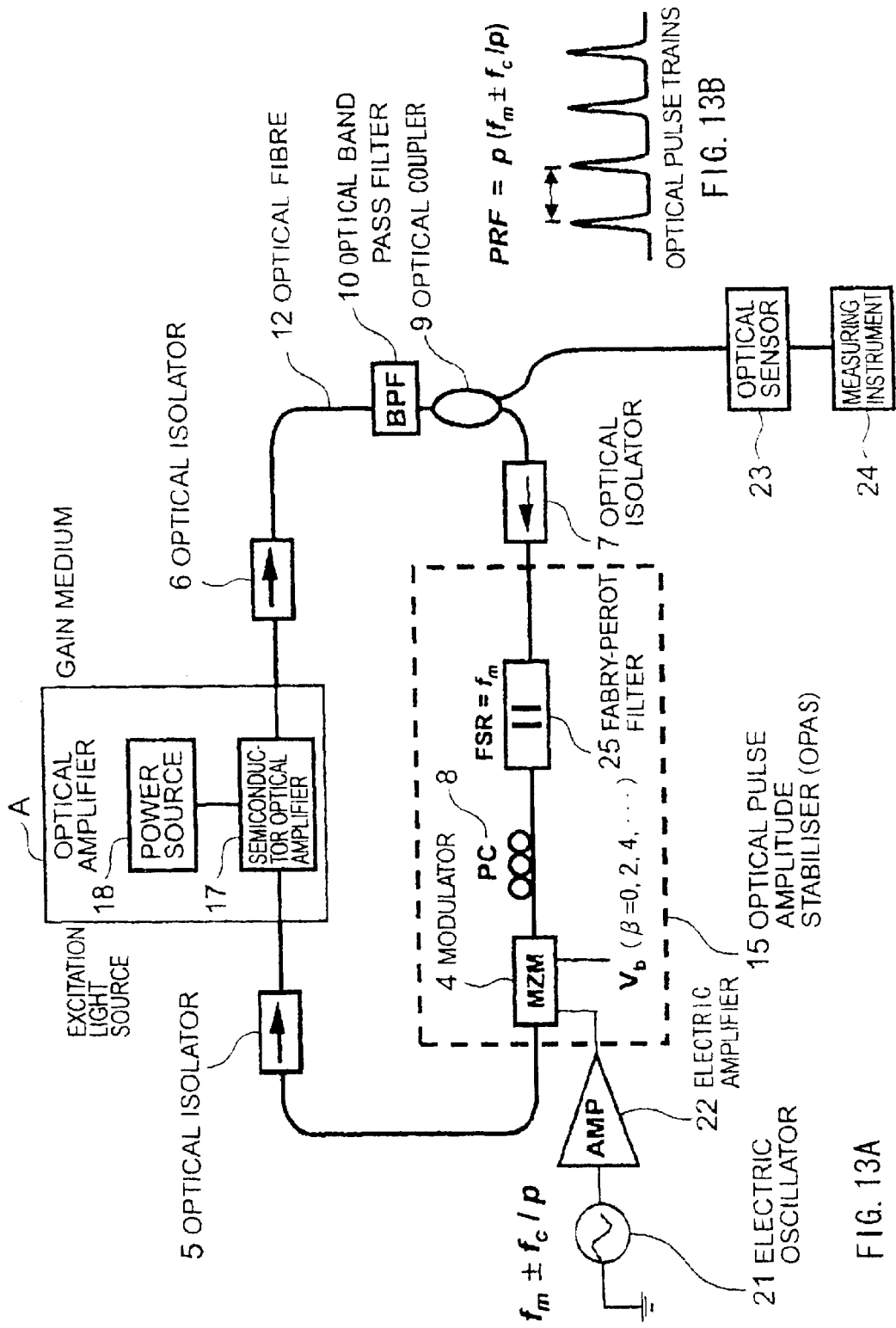

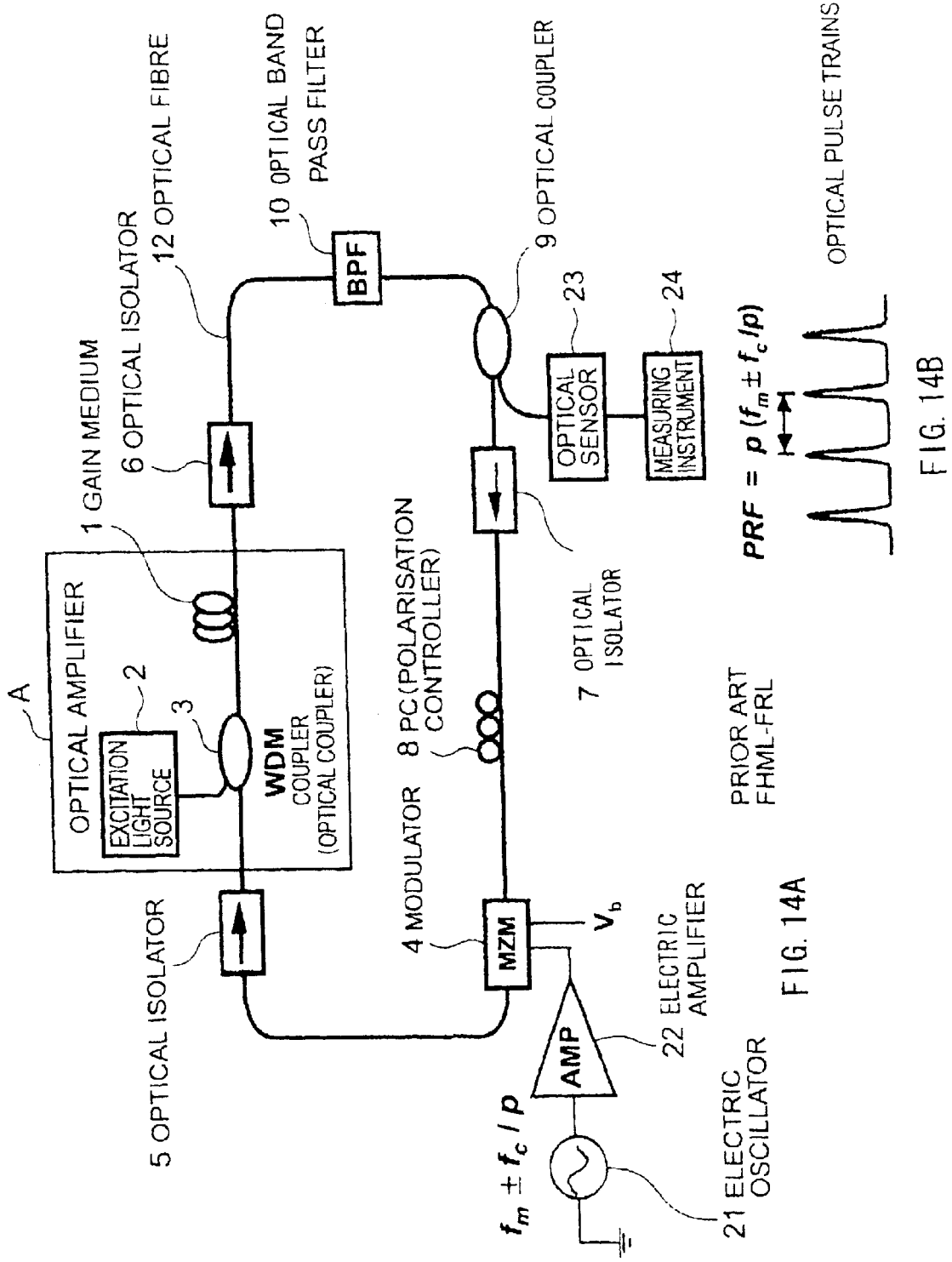

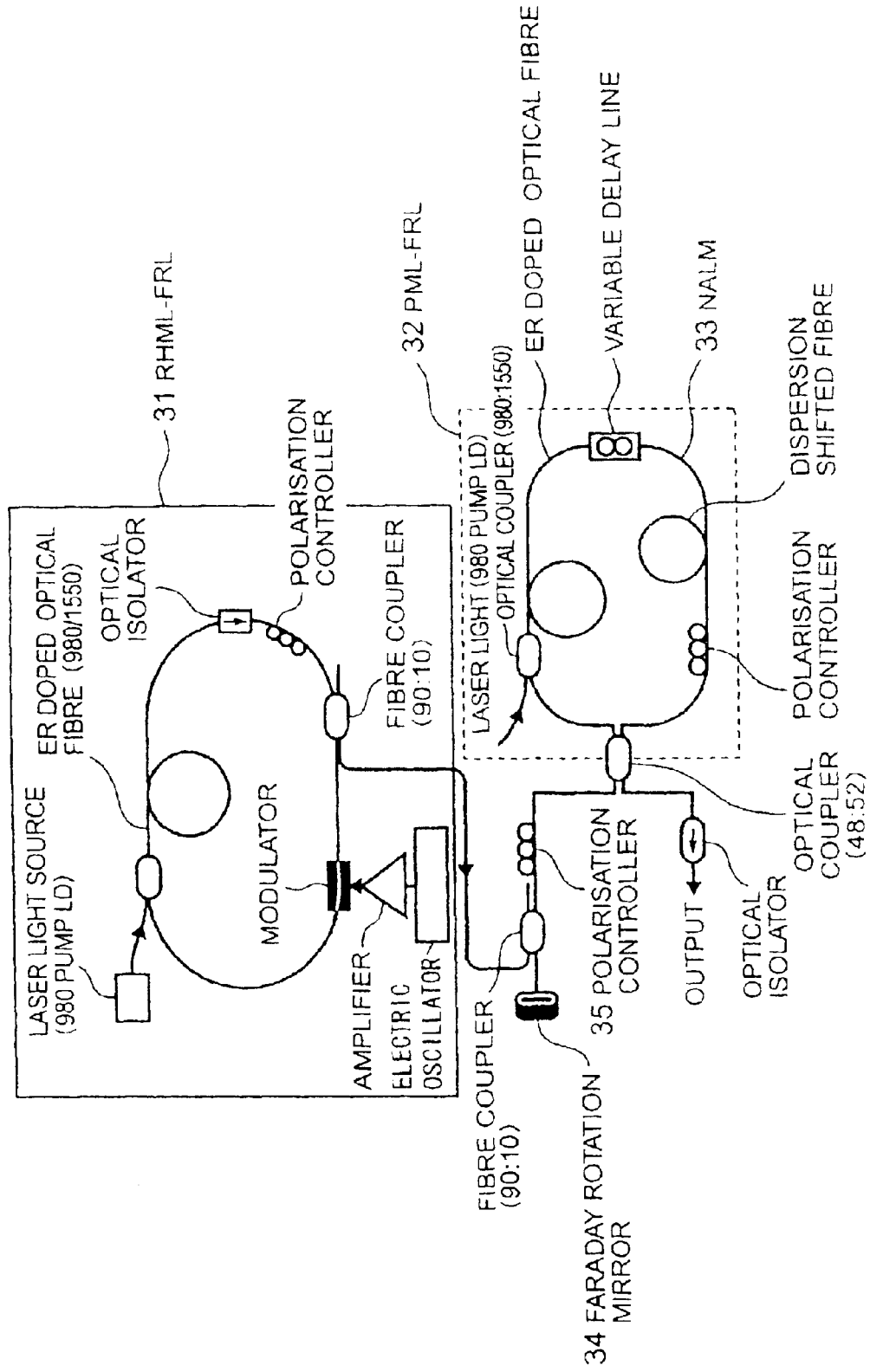

STABILIZED OPTICAL PULSE GENERATOR

CROSS REFERENCE TO RELATED APPLICATION

This application claims priority Japanese Patent Application No. 2001-306952, filed Oct. 2, 2001 in Japan, the contents of which are incorporated herein by reference.

BACKGROUND OF THE PRESENT INVENTION

1. Field of the Present Invention

The present invention relates to a stabilized optical pulse generator, and more particularly the rational harmonically mode-locked fiber ring laser (RHML-FRL) of a stabilized optical pulse generator. Optical pulse trains generated from the RHML-FRL are stabilized to a high degree with the present invention. The RHML-FRL incorporating invention, can be used as an optical pulse generating source for a high-speed optical communication system, or an optical time-division multiplexing (OTDM) system, etc., which needs stabilized optical pulse trains at high repetitions frequency. Further, the present invention can also stabilize the optical pulse train at a repetition frequency in microwave frequency band, millimetre-wave frequency band, and higher frequency bands than the frequencies, mentioned in the invention.

2. Prior Art of the Present Invention

Short optical pulses at high repetition rates are important for an ultra high-speed optical communication system. Presently, an active harmonically mode-locked fiber ring laser (ML-FRL) is very popular because of its ability to generate short and transform-limited optical pulses at high repetition rates. When RF modulation signal which is a harmonic of the cavity resonance frequency is applied to the RF port of the Mach-Zehnder intensity modulator (MZM) placed inside the cavity and biased at the quadrature point on its transmission characteristic curve (see FIG. 2), optical pulses at a repetition frequency equal to the applied RF modulation signal frequency are generated. However in such lasers, the maximum pulse repetition frequency is limited by the modulator bandwidth as well as frequency of the drive electronics. Amongst many demonstrated techniques to increase the pulse repetition (PRF) in ML-FRLs, rational harmonic mode-locking has become gradually popular because of the advantage that the PRF can be increased by simple detuning of the modulation signal frequency (see Z. Ahmed, and N. Onodera, "High-repetition rate optical pulse generation by frequency multiplication in actively mode-locked fiber ring lasers," Electron. Lett., vol. 32, pp. 455–457, 1996.)

FIG. 14A shows a prior art of the rational harmonically mode-locked fiber ring laser (RHML-FRL). In FIG. 14A, a reference symbol A is an optical amplifier, which comprises an excitation light source, and a gain medium which has optical gain characteristics. Reference numeral 1 is a gain medium which is erbium doped fibers, that is Er/Yb doped fibers. Reference numeral 2 is an excitation light source. Reference numeral 3 is a coupler (optical coupler). Reference numeral 4 is a modulator which is a Mach-Zehnder optical intensity modulator. Each of reference numerals 5, 6 and 7 is an optical isolator. Reference numeral 8 is a polarisation controller (PC). Reference numeral 9 is an optical coupler, which branches the oscillation light of the optical fiber ring to an optical sensor 23 at the ratio 90:10 (the excitation light in the optical fiber of 10% is branched to the optical sensor). Reference numeral 12 is optical fibers. Reference numeral 21 is electric oscillator which generates high frequency signals. Reference numeral 22 is an electric amplifier. Reference numeral 23 is an optical sensor which converts an optical signal to an electric signal. Reference numeral 24 is a measuring instrument which measures the signal converted to the electric signal.

In the system of FIG. 14A, the laser light generated in the excitation light source 2 excites the Erbium fibers (EDF) that is a gain medium, and the optical fiber ring excites the optical laser light of frequency of the resonance frequency $f_c$ and integer times of the resonance frequency $f_c$. The electric oscillator 21 can generate electric signals of frequency $f_m$ of integer times of $f_c$, and generates further the frequency of $f_c/p$, which is due to the applied modulation frequency that is a little shifted from the original electric signal of frequency $f_m$ (in the followings, applying the frequency a little shifted is called "detuning"). The modulator 4 is biased with a bias voltage Vb.

In the system of FIG. 14A, the modulator 4 generates optical pulses of high frequencies of even times or odd times of the applied modulation frequency $f_m$ in the optical fiber ring according to the applied voltage Vb. When the frequency applied to the modulator is detuned by $f_c/p$ from $f_m$, optical pulse trains of repeating frequency (PRF) of $p(f_m \pm f_c/p)$ is generated as shown in FIG. 14B. The action of the rational harmonic mode-locking of FIG. 14A is explained referring FIGS. 1A–1E.

FIGS. 1A–1E are explanation drawings of time domain depiction of pulse repetition frequency multiplication in the RHML-FRL. In FIG. 1, trace 1 shows loss in the cavity while pulse repetition frequency multiplication is shown in trace 2–trace 5 in FIG. 1

The pulse repetition frequency multiplication via rational harmonic mode-locking is based on an interaction between circulating optical pulses and loss modulation within the laser cavity. In active harmonically mode-locked fiber ring laser, the laser is mode-locked at the $n^{th}$ harmonic of its cavity resonance frequency and there are n-number of pulses circulating inside the cavity and on every cavity round-trip, each pulse passes through the modulator at minimum loss or maximum transmission point in its modulator transfer characteristic curve as shown in trace 2 in FIG. 1. When the applied modulation signal frequency is decreased by f/p, there is corresponding time delay of T/p in the arrival of each circulating pulse with respect to loss minima, where T is the modulation period.

For example, when $f_m$ is decreased by $f_c/2$, each pulse is delayed by half the modulation period i.e. T/2. As a result, each pulse on its next arrival at the modulator will pass through the modulator at loss maxima as shown in the trace 3. Here pulse 'A' which was originally at a point of loss minima '0' arrives at a point of loss maxima which is at half-way between loss minima '2' and '3' after one cavity round-trip, hence receiving maximum loss. Since relaxation time of the EDF-gain medium is much longer (of the order of 10 milliseconds) compared to pulse round-trip time (of the order of tens of microseconds), a complete suppression of pulse 'A' does not occur. However during $2^{nd}$ cavity round-trip, pulse 'A' is further delayed by T/2 such that it now arrives at loss minima '4' and therefore receives minimum loss or maximum gain. It means that each pulse will experience minimum loss or maximum gain on every $2^{nd}$ round-trip of cavity which is also true for other pulses circulating within the cavity. As a result, pulse repetition rate of output optical pulse trains would now be twice the repetition rate realised via conventional harmonic mode-locking, thereby establishing pulse repetition frequency doubling. The pulse repetition frequency tripling and quadrupling can also be explained in the same manner and are shown in traces 4 and 5, respectively. In the case of pulse repetition frequency quadrupling, the $f_m$ is detuned by $f_c/4$ leading to each pulse delayed by T/4 and pulse 'A' in the pulse sequence 'ABCD' would now experience minimum loss once in every $4^{th}$ cavity round-trips which leads to pulse repetition frequency quadrupling as shown in trace 5 in FIG. 1E. In the following explanation, $f_{m'}$ is defined as $f_{m'}=f_m\pm f_c/p$.

There are several advantages of RHML-FRL such as an optical pulse train can be generated at a much higher repetition rates by using lower frequency drive electronics. However the main limitation associated with RHML-FRL is that the laser suffers with the inherent pulse amplitude instability which includes both amplitude noise and inequality in pulse amplitudes. The amplitude noise in the generated optical pulses is mainly due to supermode noise caused by the unequal energy distribution amongst the cavity modes which is attributed to the longer relaxation time of the gain medium compared to the pulse round trip time. While the unequal pulse amplitudes in optical pulse trains are mainly due to asymmetric cavity loss modulation within the cavity caused by the presence of randomly oscillating intermediate modes that are frequency spaced at $f_m$, 2 $f_m$, 3 $f_m$ (for PRF=$4f_m$) and become prominent at a pulse repetition frequency greater than 2 $f_m$ (for p>2). As a result, in RHML-FRL, the optical pulse trains with repetition frequency greater than 2 $f_m$ exhibit high degree of pulse amplitude instability.

In order to increase pulse amplitude stability in RHML-FRL, it is very important that the randomly oscillating cavity resonance modes at $f_c$, and intermediate longitudinal modes at $f_m$, 2 $f_m$, etc. are suppressed relative to the main oscillating longitudinal modes which are phase matched with each other and separated by frequency $pf_m$ which is also equal to the desired pulse repetition frequency.

To make RHML-FRL as an useful optical pulse source for practical applications in high-speed optical communications networks, it is essential that the generated pulses are equal in amplitude with minimum amplitude noise.

In such lasers, only one attempt has been made to increase pulse amplitude stability (see M. Y. Jeon, H. K. Lee, J. T. Ahn, D. S. Lim, H. Y. Kim, K. H. Kim, and E. H. Lee, "External fiber laser based pulse amplitude equalisation scheme for rational harmonic mode-locking in a ring-type fiber laser," Electron., Lett., vol 34, pp. 182–184, 1998.)

FIG. 15 shows the system of M. Y. Jeon etc. In FIG. 15, reference numeral 31 is a RHML-FRL Reference numeral 32 is PML-FRL (passively mode-locked fiber ring laser). Reference numeral 33 is NALM (non-liner amplifying loop mirror). Reference numeral 34 is a Faraday rotating mirror. Reference numeral 35 is a polarisation controller.

In the system of FIG. 15, the pulse amplitude equalisation of optical pulse train at a repetition rate of 4 $f_m$ (for p=4) was achieved by a complex method. In this technique, pulse amplitude equalisation was based on the additive pulse mode-locking (APM) action within the externally coupled passively mode-locked fiber ring laser (PML-FRL) which consists of a nonlinear amplifying loop mirror (NALM), and a linear Faraday rotating mirror. The APM seems to be as a non-linear amplitude modulation produced by interfering two self-phase modulated versions of the same mode travelling within the PML-FRL. The combination of polarisation controller and the Faraday rotating mirror transform linear polarisation into elliptic polarisation which then rotates via the Kerr-effect of optical fiber, the angle of rotation being proportional to intensity of the circulating optical signal. This polarisation based on the intensity discrimination then leads to pulse amplitude equalisation of optical pulses from RHML-FRL.

It is evident that this reported technique of pulse amplitude equalisation in an RHML-FRL is very complex to realise and works under certain very stringent operating conditions such as the cavity resonance of the externally coupled PML-FRL must be exactly equal to an harmonic multiple of the resonance frequency of the main RHML-FRL cavity, requires delicate adjustments of the polarisation controller as well as the NALM loop length. Besides that many additional components such as optical erbium-doped fiber amplifier, polarisation controller, Faraday rotating mirror, optical couplers, isolators etc., are required to assemble the PML-FRL and therefore such a scheme becomes very expensive to realise. Further more, extra cavity structure not only increases the overall size of the complete laser system, but also quite sensitive to the surrounding temperature variations and mechanical disturbances which can easily disturb the requirement of the perfect matching of resonance frequency of PML-FRL with that of the RHML-FRL and thereby making this scheme a very complex and difficult to realise.

SUMMARY OF THE PRESENT INVENTION

The first objective of the present invention is to provide an optical pulse amplitude stabilizer (OPAS) that eliminates amplitude instability in higher-order optical pulses in a rational harmonically mode-locked fiber ring laser (RHML-FRL). The OPAS is based on the principle of intra-cavity optical filtering via a fiber-Fabry-Perot filter (FFP), and nonlinear characteristic of Mach-Zehnder intensity modulator. The main advantage of the OPAS is that the pulse amplitude stabilization is realised within the RHML-FRL which leads to a significant reduction in the number of components required for amplitude equalisation and the associated complexities.

Another objective of the present invention is to provide the RHML-FRL having high stability of the high repeating pulse train with a very compact system which is easy to assemble and cost effective.

Another objective of the present invention is to provide a highly stable optical pulse source for generating optical pulse trains at the high repetition rate for ultra high-speed optical communication systems.

In the present invention, a fiber-Fabry-Perot filter (FFP), of which FSR is equal to $f_m$ or integer times of $f_m$, is introduced in the cavity of RHML-FRL. A simple and novel technique for pulse amplitude stabilization in RHML-FRL, which is based on intra-cavity optical filtering via a fiber Fabry-Perot filter with FSR equal to $f_m$, and even-order modulation sidebands generation using nonlinear characteristics of MZM, is presented. Thus an optical pulse amplitude stabilisation in RHML-FRL is provided.

Referring FIGS. 2, 3A, 3B, 3C, 4A, 4B, 4C and 4D, frequency multiplication by the Mach-Zehnder optical intensity modulator and the principle of the present invention are explained. FIG. 2 shows a relation between bias voltage applied to the Mach-Zehnder optical intensity modulator and output intensity. FIGS. 3A, 3B and 3C show an explanation of generating even order modulating frequency of $f_m$ by the modulator. FIGS. 4A, 4B, 4C and 4D show an explanation of enhancing $4^{th}$ harmonics of the modulation signal applied to the MZM with the present invention.

If the MZM is biased at the maximum transmission point (see FIG. 2) and driven by a strong modulation signal, one can generate even-order modulation sidebands at ($f_0 \pm 2 f_m$), ($f_0 \pm 4 f_m$), etc., while suppressing both optical carrier at $f_0$ as well as odd-order sidebands at ($f_0 \pm f_m$), ($f_0 \pm 3 f_m$), etc. where $f_0$ is optical carrier frequency. We used this concept to generate $2^{nd}$-order modulation sidebands at ($f_0 \pm 2f_m$) in order to further enhance, for example, the laser excitation of $4^{th}$-order modes which are frequency spaced at $4 f_m$ or integer times thereof and achieve complete suppression of the randomly oscillating intermediate longitudinal modes at $f_m$, $2 f_m$, and $3 f_m$. In addition, a FFP was included within the cavity to select, for example, the dominant $4^{th}$-order modes at $4 f_m$ which are phase matched and frequency spaced at $f_m$ or integer times of $f_m$, for example $4 f_m$. More precisely, the $4^{th}$-order modes are frequency spaced at $f_m'=f_m \pm f_c/4$ instead of $f_m$, or an integer multiple thereof and therefore get selected by the FFP filter. Thereby filtering out the randomly oscillating intermediate longitudinal modes as well as the cavity resonance modes. As a result, the pulse amplitude stability in the generated $4^{th}$-order optical pulse trains or integer times thereof in the RHML-FRL is increased.

It is a well-known fact that if the modulator is biased at the quadrature point of its transfer characteristic curve, sidebands of the applied modulation signal $f_m$ are generated on each side of the carrier at a frequency spacing equal to the modulation signal frequency. When such an optically modulated signal is detected using a photodetector, the beating between the carrier and the various modulation sidebands leads to the generation of the harmonic frequency components of the applied modulation signal in the detected RF spectrum. Since the modulator has a nonlinear transfer characteristic, when the modulator is driven with a large modulation signal power, additional modulation sidebands are also generated at a frequency $nf_m$, where n is an integer. This nonlinear characteristic of the modulator is being used for frequency multiplication via suitable biasing at its transfer characteristic curve. For example, when the modulator is biased at the minimum transmission point, the carrier frequency components and even-order modulation sidebands at ($f_0 \pm 2 f_m$), ($f_0 \pm 4 f_m$) etc. are suppressed while the odd order sidebands at ($f_0 \pm f_m$), ($f_0 \pm 3f_m$), etc. become enhanced. Since the first-order sidebands at ($f_0 \pm f_m$) are dominant, the detected RF spectrum displays the harmonics of the frequency component which is two-times the frequency of the applied modulation signal. This mechanism of frequency up conversion is defined as frequency doubling.

The concept of frequency doubling using the nonlinearity of the Mach-Zehnder intensity modulator was later extended to generate the 4th harmonic of the modulation signal. This mechanism of 4th harmonic generation is similar to the method of 2nd harmonic generation except that now the modulator is biased at the maximum transmission point in its transfer characteristic curve and driven appropriately by the modulation signal. Under proper drive conditions, optical carrier and odd order sidebands are suppressed while even order sidebands at ($f_0 \pm 2 f_m$), ($f_0 \pm 4 f_m$) etc become enhanced. These sidebands then appear in the detected RF spectrum as a 4th harmonic of the modulation signal. This scheme of $4f_m$ multiplication is defined as frequency quadrupling.

The frequency multiplication method in Mach-Zehnder intensity modulator can be described qualitatively as follows. Consider an optical signal of amplitude A and angular frequency $\omega_0$ passing through a Mach-Zehnder intensity modulator with switching voltage $V_\pi$. The output field from the modulator can be described by:

$$E_{out}(t) = A \cos\left(\frac{\pi}{2} \frac{V(t)}{V_\pi}\right) \cos(\omega_0 t) \qquad (1)$$

where V(t) is the total voltage applied to the modulator. When the modulator is driven by a sinusoidal modulation signal of amplitude $V_{ac}$ and angular frequency $\omega_m$, and is biased at $V_b$, the total input voltage V(t) applied to the modulator is given as:

$$V(t) = \beta V_\pi + \alpha V_\pi \cos(\omega_m t) \qquad (2)$$

where $\beta = V_b/V_\pi$ is the normalised bias voltage of the modulator, and $\alpha = V_{ac}/V_\pi$ is the normalised amplitude of the modulation signal. The corresponding output field from the modulator is then:

$$E_{out}(t) = A \cos\left(\beta \frac{\pi}{2} + \alpha \frac{\pi}{2} \cos(\omega_m t)\right) \cos(\omega_0 t) \qquad (3)$$

Expanding the output field in eqn. 3 in the form of Bessel's functions gives:

$$E_{out}(t) = A \begin{pmatrix} J_0(\alpha\frac{\pi}{2}) \cos(\beta\frac{\pi}{2}) \cos(\omega_0 t) - \\ J_1(\alpha\frac{\pi}{2}) \sin(\beta\frac{\pi}{2}) \sum \cos(\omega_0 t \pm \omega_m t) - \\ J_2(\alpha\frac{\pi}{2}) \cos(\beta\frac{\pi}{2}) \sum \cos(\omega_0 t \pm 2\omega_m t) + \\ J_3(\alpha\frac{\pi}{2}) \sin(\beta\frac{\pi}{2}) \sum \cos(\omega_0 t \pm 3\omega_m t) + \\ J_4(\alpha\frac{\pi}{2}) \cos(\beta\frac{\pi}{2}) \sum \cos(\omega_0 t \pm 4\omega_m t) - \\ J_5(\alpha\frac{\pi}{2}) \sin(\beta\frac{\pi}{2}) \sum \cos(\omega_0 t \pm 5\omega_m t) - \\ J_6(\alpha\frac{\pi}{2}) \cos(\beta\frac{\pi}{2}) \sum \cos(\omega_0 t \pm 6\omega_m t) + \ldots \end{pmatrix} \qquad (4)$$

where $J_i$ is the $i^{th}$ Bessel's function of the first kind. The first term in eqn. 4 represents the optical carrier at frequency $\omega_0$, while the subsequent terms $J_1, J_2, J_3$, etc., represent $1^{st}$ order, $2^{nd}$ order, $3^{rd}$ order sidebands at optical frequencies of ($\omega_0 \pm \omega_m$), ($\omega_0 \pm 2\omega_m$), ($\omega_0 \pm 3\omega_m$), respectively.

There are two cases of particular interest, which occur when $\beta$ is either an odd integer (1, 3, 5, ...) or $\beta$ is an even integer (2, 4, 6, ...). These two respective cases correspond to the position of minimum and maximum transmission point on the MZM (Mach-Zehnder Modulator) transfer function as shown in FIG. 2.

Equation 4 also shows that if the modulator is biased at $\beta=0$ (which corresponds to the maximum transmission point in the modulator transfer function shown in FIG. 2), then the odd order sidebands at ($\omega_m \pm \omega_m$), ($\omega_0 \pm 3\omega_m$), etc., are suppressed instead. The optical spectrum will then consist of a carrier component at $\omega_0$ and even order sidebands at ($\omega_0 \pm 2\omega_m$), ($\omega_0 \pm 4\omega_m$), etc., lying on either side of the carrier. The Bessel's function expansion of the output field from the modulator that is biased at the maximum transmission point can be expressed from eqn. 4 as:

$$E_{out}(t) = A \begin{pmatrix} J_0(\alpha\frac{\pi}{2})\cos(\omega_0 t) - \\ J_2(\alpha\frac{\pi}{2})\sum \cos(\omega_0 t \pm 2\omega_m t) + \\ J_4(\alpha\frac{\pi}{2})\sum \cos(\omega_0 t \pm 2\omega_m t) - \ldots \end{pmatrix} \quad (5)$$

It can be seen from eqn. 5 that the presence of an optical carrier which beats with the $2^{nd}$-order sidebands at $(\omega_0 \pm 2\omega_m)$, leads to the contribution towards the generation of frequency components at $\pm 2\omega_m$, the undesired $2^{nd}$ harmonic of the modulation signal frequency. Therefore in order to generate only the $4^{th}$ harmonic of the applied modulation signal, the carrier component represented by the $J_0$ term in eqn. 5 has to be completely suppressed i.e. $J_0(\alpha\pi/2)=0$. The complete suppression of the carrier can be achieved by selecting the normalised amplitude of the modulating signal $\alpha$ to be equal to 1.53. The Bessel's function expansion of the output field from the modulator which is biased at the maximum transmission point ($\beta=0$) and driven with a normalised amplitude of the modulation signal $\alpha=1.53$, is given by:

$$E_{out}(t) = -A \begin{pmatrix} J_2(\alpha\frac{\pi}{2})\sum \cos(\omega_0 t \pm 2\omega_m t) - \\ J_4(\alpha\frac{\pi}{2})\sum \cos(\omega_0 t \pm 4\omega_m t) + \\ J_6(\alpha\frac{\pi}{2})\sum \cos(\omega_0 t \pm 6\omega_m t) - \ldots \end{pmatrix} \quad (6)$$

It is evident from eqn. 6 that the optical carrier component $J_0$ is completely eliminated while the $2^{nd}$-order sidebands at $(\omega_0 \pm 2\omega_m)$ become dominant.

After detection with a high-speed photodetector, RF spectrum will therefore consists of harmonics of the frequency component at 4 $f_m$, the $4^{th}$ harmonic of the applied modulation signal frequency as shown in FIG. 3, thereby realising frequency quadrupling in Mach-Zehnder optical intensity modulator.

Further a mechanism of the pulse modulation stabilization of RHML-FRL by an OPAS is explained.

As described earlier, under conventional harmonic mode-locking, a modulation signal $f_m$ is applied to the MZM and the cavity supports main longitudinal modes which are phase matched and the cavity resonance modes which are randomly oscillating. These randomly oscillating cavity modes contribute to the pulse amplitude instability in an ML-FRL. The same instability is also caused in rational harmonically mode-locked fiber ring laser wherein the unmatched intermediate longitudinal modes also contribute to pulse amplitude instability in addition to the randomly oscillating cavity resonance modes. In order to increase amplitude stability of oscillation of $4^{th}$-order optical pulse trains in RHML-FRL, the oscillation of $4^{th}$-order modes which are separated by 4 $f_{m'}$ are enhanced and simultaneously suppressing the random oscillations of the intermediate longitudinal modes which are separated by $f_{m'}$, $2f_{m'}$, and $3f_{m'}$, as well as the cavity resonance modes separated by $f_c$.

FIGS. 4A, 4B, 4C and 4D show a qualitative explanation of the mechanism of pulse amplitude stabilization of $4^{th}$-order optical pulse trains via OPAS in RHML-FRL which includes both of optical filtering and generation of $2^{nd}$-order modulation sidebands as shown in the followings. In the rational harmonic mode-locking, the modulation signal frequency $f_m$ is detuned $f_c/4$, as a the result, the modes which are frequency spaced at 4 $f_{m'}$ (4 $f_{m'}=f_m \pm f_c/4$) are phase matched and therefore their oscillations are enhanced with the expense of the energy in the intermediate modes as shown in trace 2 (see, FIGS. 4A, 4B). The arrow 1 represents the contribution of rational detuning, that is, increasing the energy or oscillations of the $4^{th}$-order longitudinal modes is shown. These modes are further enhanced by the generation of $2^{nd}$-order modulation sidebands which are frequency spaced at 4 $f_{m'}$. The arrow 2 represents the contribution form the $2^{nd}$-opder modulation sidebands generation. These prominent $4^{th}$-order modes are selected with the FFP transmissions which are separated by 4FSR, while other intermediate modes including the cavity resonance modes are filtered out as shown in trace 3 (see FIG. 4(c)). Since the cavity consists of highly suppressed randomly oscillating modes, the amplitudes of the output pulses are therefore highly stabilized (see FIG. 4D).

The present invention is based on the above mentioned principle, and comprises the following constitution. A stabilized optical pulse generator of the present invention comprises an optical fiber ring composed of optical fibers, an optical amplifier and a modulator for optical modulation, and electric signal generator generating high frequency signals (corresponding to electric oscillator in FIGS. 5A, 13A and 14A. The stabilized optical pulse generator generates optical pulse trains at a repetition frequency which is an integer multiple of the applied modulation electric signal frequency that is slightly detuned from an integer multiple of the resonance frequency of the optical fiber ring cavity. Further the stabilized optical pulse generator comprises an optical pulse stabilizer which stabilizes the optical pulse train by suppressing the carrier components and a part of harmonics components.

Moreover, a stabilized optical pulse generator of the present invention comprises an optical fiber ring, an optical amplifier and a modulator for optical modulation, and an electric signal generator generating high frequency signals. The stabilized optical pulse generator of the present invention generates optical pulse trains of repetition frequency $f_m$ when applying electric signals of frequency of $f_m$ to the modulator. Wherein, as a resonance frequency $f_c$ of the optical fiber ring cavity, the modulation frequency applied to the modulator is detuned from the high frequency electric signal $f_m$ by frequency of the resonance frequency $f_c$ divided by integer of p. Thus the stabilized optical pulse generator of the present invention generates the optical pulse train of repetition frequency of p times of $f_m+f_c/p$ or $f_m-f_c/p$. Further the optical laser pulse train comprises an optical pulse stabilizer to stabilize the optical pulse train by suppressing carrier components and a part of high frequency components.

According to the present invention, fiber ring laser device generating optical pulses at a high degree of pulse amplitude stability in terms of pulse amplitude equality, and extremely low amplitude noise. In addition, the generated optical pulse trains show a very small pulse timing jitter. Thereby confirming the high degree of pulse stability achieved by the present invention. So an optical pulse amplitude stabilizer required for stabilizing the high frequency optical pulse train can be realised. Thus a highly stabilized optical pulse source for generating optical pulse trains at high repetition rates for ultra high-speed optical communication systems can be provided with the present invention. Moreover, the system of the present invention is compact and the system may be assembled with a few components.

The objects, advantages and features of the present invention will be more clearly understood by referencing the following detailed disclosure and the accompanying drawings.

BRIEF DESCRIPTION OF DRAWINGS

FIG. 4A shows an explanation figure of a concept of the present invention.

FIG. 4B shows an explanation figure of a concept of the present invention.

FIG. 4C shows an explanation figure of a concept of the present invention.

FIG. 4D shows an explanation figure of a concept of the present invention.

FIG. 5A shows a preferred embodiment 1 for implementing the present invention.

FIG. 5B shows an optical pulse train of a mode 1 for implementing the present invention.

FIG. 13A shows a preferred embodiment 2 for implementing the present invention.

FIG. 13B shows an optical pulse train of the mode 2 for implementing the present invention.

FIG. 14A shows a constitution of prior art RHML-FRL.

FIG. 14B shows an optical pulse train of the prior art RHML-FRL.

FIG. 15 shows a constitution to equalize amplitudes in prior art RHML-FRL.

DETAILED DESCRIPTION OF THE PREFERRED EMBODIMENT

Figure 1:
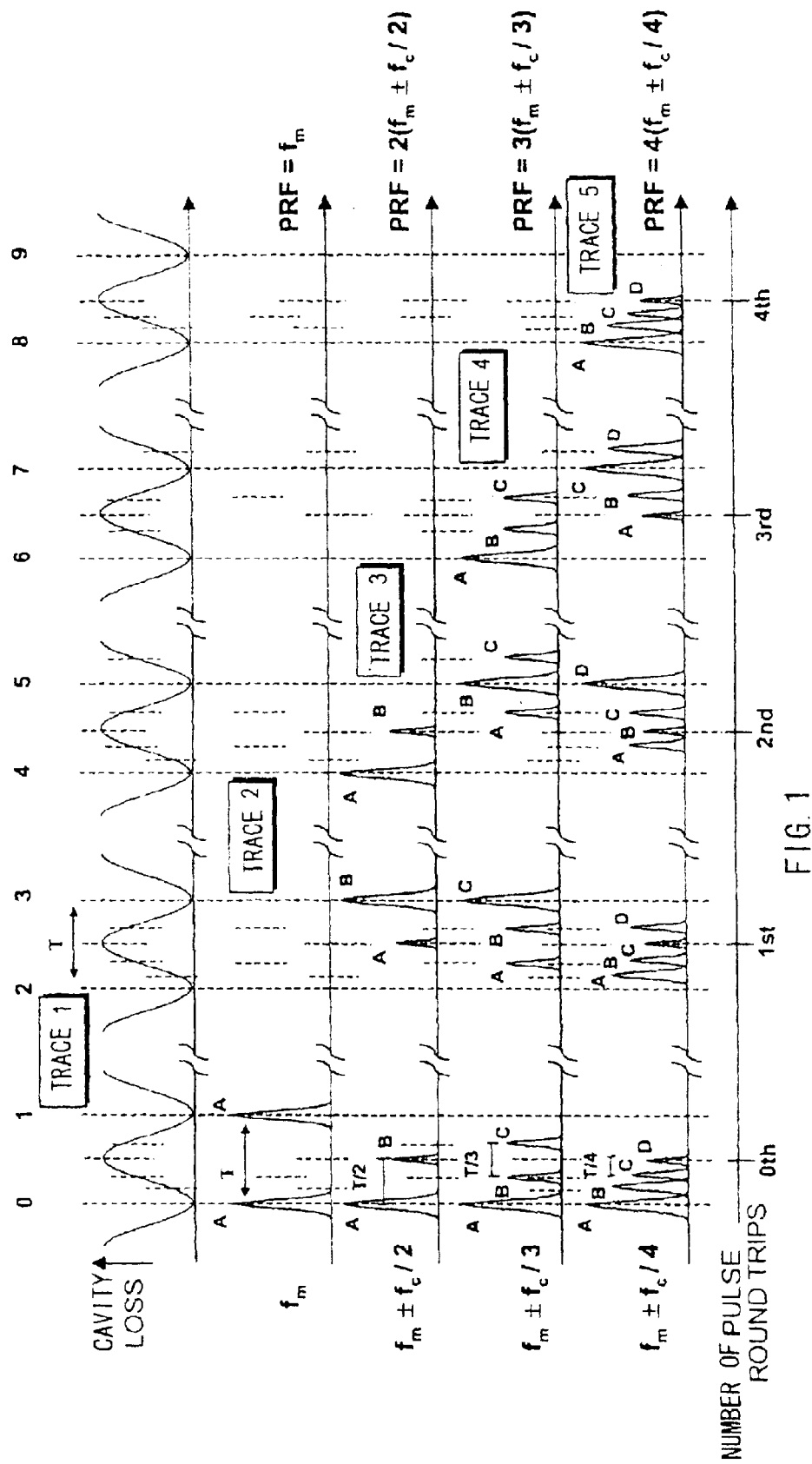
FIG. 1 shows explanation of time domain depiction of pulse repetition frequency multiplication in the RHML-FRL, Step 1 in FIG. 1 shows an explanation figure of loss modulation condition in actively mode-locked fiber ring laser. Step 2 shows an explanation figure of operation of active harmonic mode-locking. Step 3 shows an explanation figure of pulse repetition frequency doubling in RHML-FRL. Step 4 shows an explanation figure of principle of pulse repetition frequency tripling in RHML-FRL. Step 5 shows an explanation figure of principle of pulse repetition frequency quadrupling in RHML-FRL.
Figure 2:
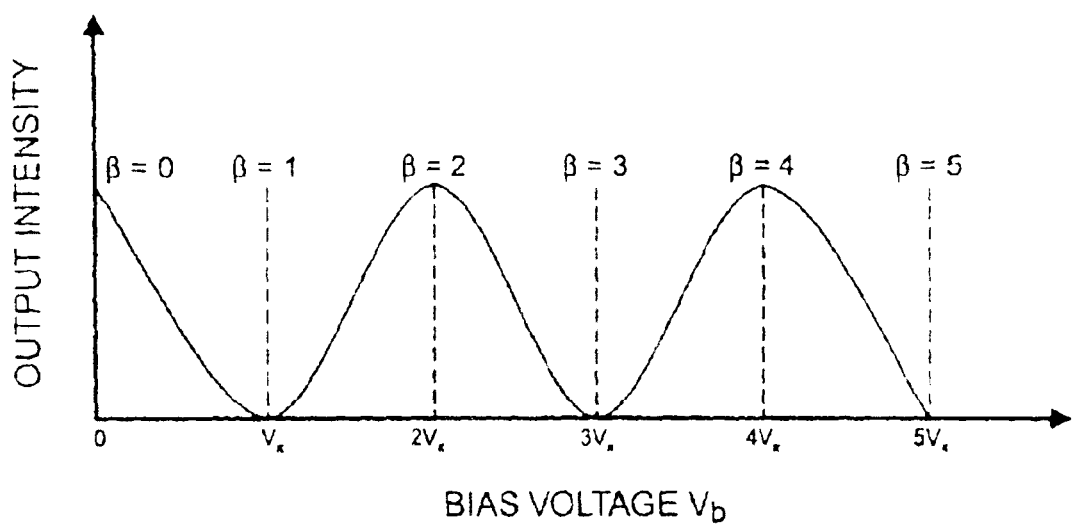
FIG. 2 shows a relation ship between bias voltage and output of a Mach-Zehnder intensity modulator.
Figure 3A:
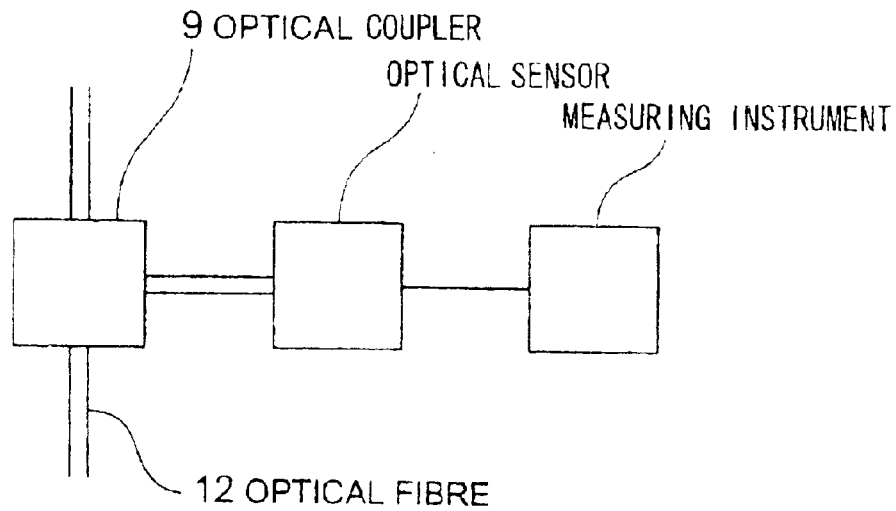
FIG. 3A shows a system to measure the spectrum of the pulse train.
Figure 3B:
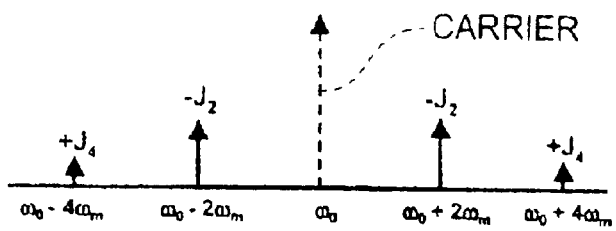
FIG. 3B shows an explanation figure of even order modulation side bands in a Mach-Zehnder intensity modulator.
Figure 3C:
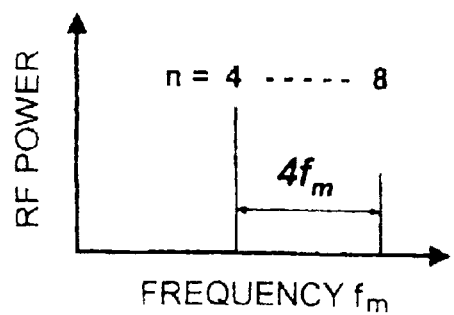
FIG. 3C shows an explanation figure of generation of $4^{th}$-harmonic of the modulation signal frequency applied to the Mach-Zehnder intensity modulation.

FIGS. 5A and 5B show a preferred embodiment 1 for implementing the present invention. Components in FIG. 5A of same numeral with in FIG. 14A show same parts in FIG. 14A. Reference symbol A is an optical amplifier which comprises optical fibers having amplifying characteristic and an excitation light source. In the system of FIG. 5A, the gain medium is optical fibers doped with rare earth metal such as Erbium (Er), Thulium (Tm), Neodymium (Nd), Praseodymium (Pr) for producing the optical amplifier characteristic. Optical fibers of fluoride series can be used instead. Further a Raman amplifier composed of an excitation light source and optical fibers can be used as the optical amplifier. Further the optical amplifier may be composed of a semiconductor amplifier and power source instead of the gain medium such as the above mentioned optical fibers (see FIG. 13A).

In the following description, an example using erbium doped fibers (EDF) is explained. In FIG. 5A, reference numeral 1 is a gain medium composed of the erbium optical doped fiber (EDF). Reference numeral 25 is a Fabry Perot filter. FIG. 5B shows an optical pulse train which is excited with the fiber ring laser (FRL) shown in FIG. 5A and output from the fiber ring laser.

The experimental setup of a rational harmonically mode-locked fiber ring laser incorporating FFP with FSR=3.48 GHz and a finesse of 213 is shown in FIG. 5A and 5B. The laser consists of conventional single mode fibers, and an Er/Yb co-doped silica fiber as an active medium that was pumped by a 1064 nm laser via a WDM coupler 3. The total cavity length was 55.8 m which corresponds to a cavity resonance frequency of 3.68 MHz. The wavelength tuning was achieved using an optical bandpass filter with a 3 dB bandwidth of 2.5 nm at 1550 nm while the mode-locking was induced via an intra-cavity 10 GHz MZM (Mach-Zehnder optical intensity modulator 4) with a switching voltage of 4.16 V. The output from the ring cavity comes out through an asymmetrical coupler which reflects 90% of the light back into the cavity.

Figure 6A:
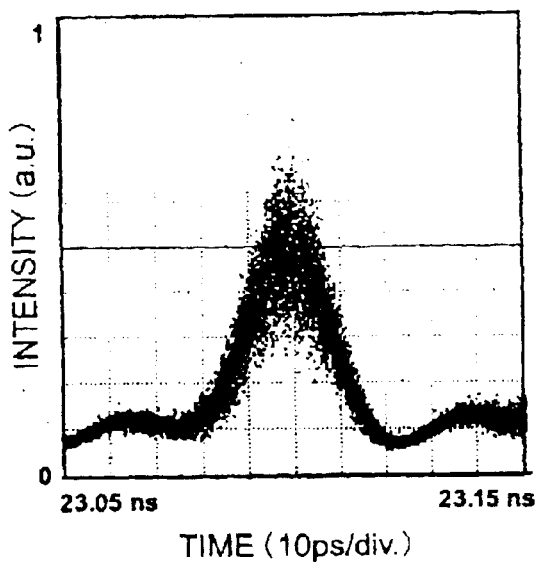
FIG. 6A shows a close-in view of the pulse generated from a conventional RHML-FRL without present invention.
Figure 6B:
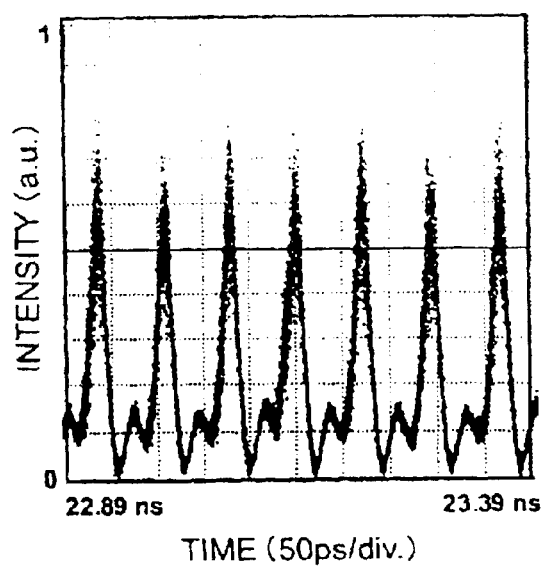
FIG. 6B shows a pulse train from the conventional RHML-FRL without present invention.
Figure 7A:
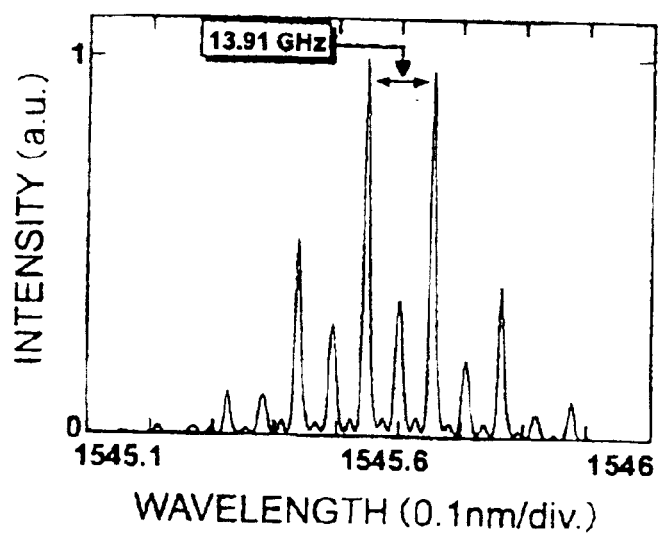
FIG. 7A shows optical spectrum from the conventional RHML-FRL without present invention.
Figure 7B:
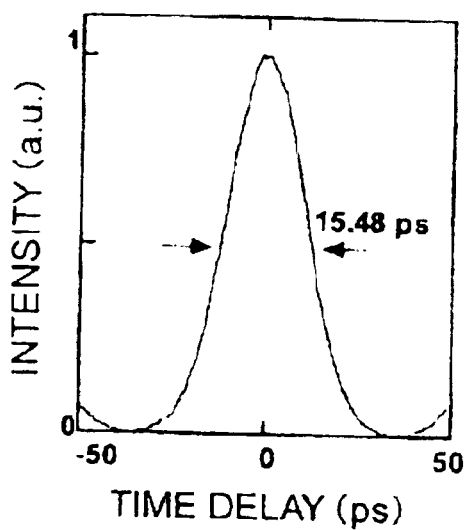
FIG. 7B shows an autocorrelation pulse profile of the generated optical pulses obtained from the conventional RHML-FRL without the present invention.
Figure 8A:
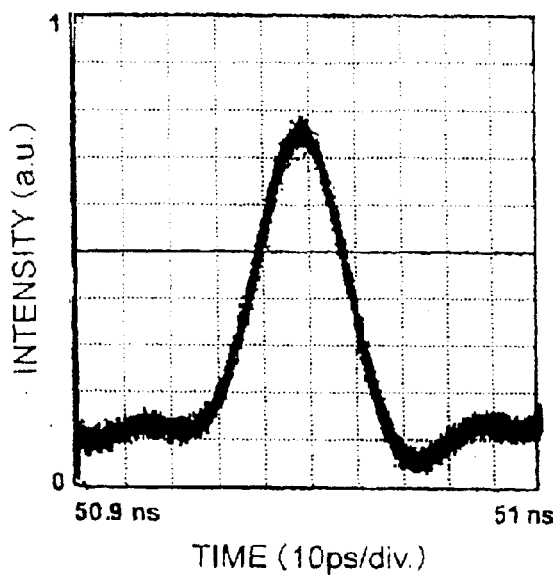
FIG. 8A shows close-in view of optical pulse generated from RHML-FRL implementing the present invention.
Figure 8B:
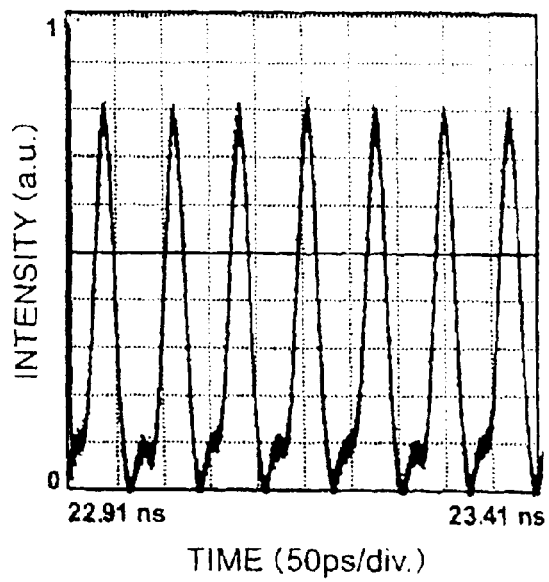
FIG. 8B shows a pulse train obtained from the RHML-FRL implementing the present invention.
Figure 9A:
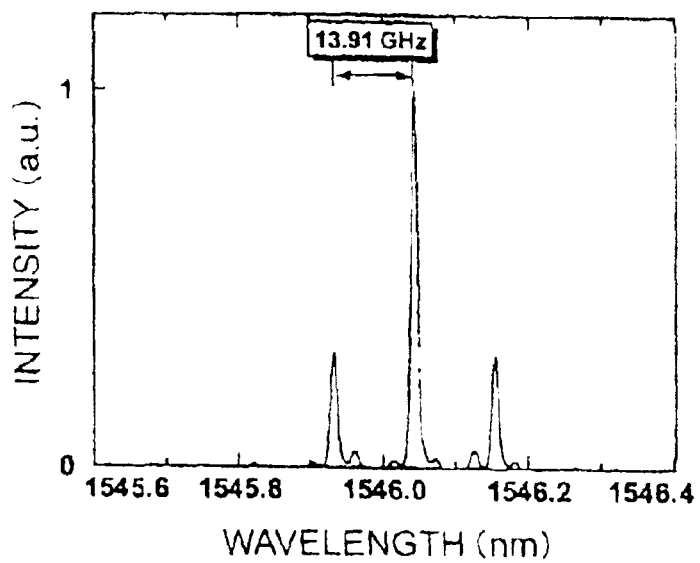
FIG. 9A shows optical spectrum pulse train from RHML-FRL implementing the present invention.
Figure 9B:
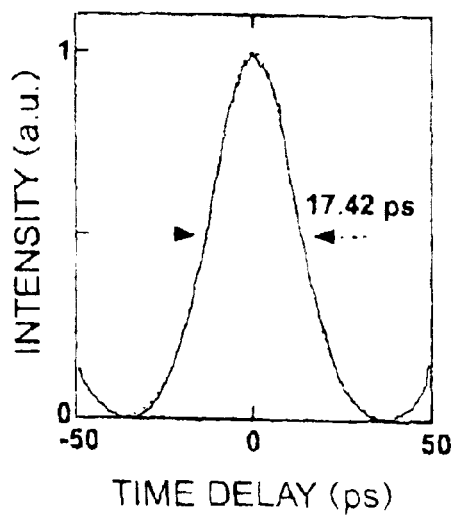
FIG. 9B shows autocorrelation pulse profile of optical pulses from RHML-FRL implementing the present invention.
Figure 10:
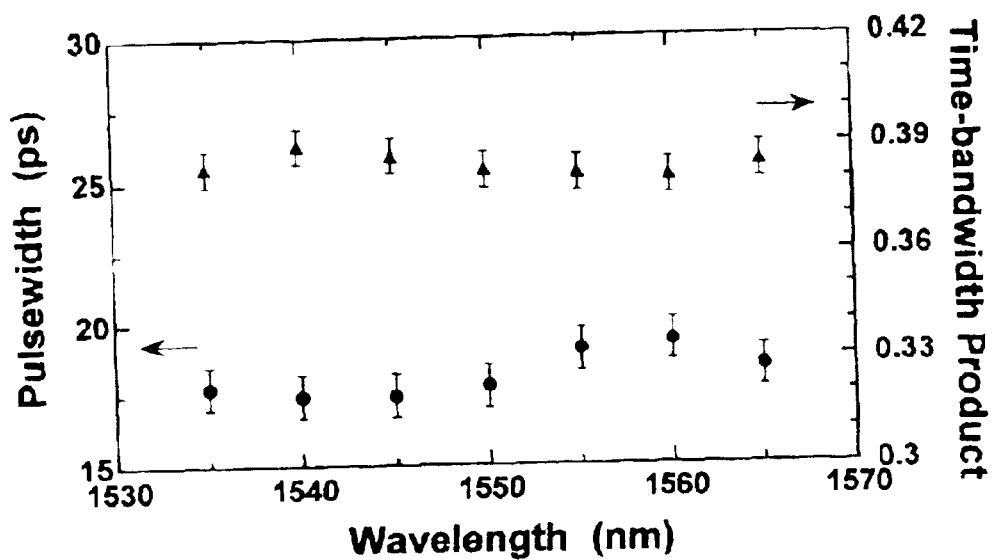
FIG. 10 shows relations between wavelength and pulse width, and between wavelength and time-band width product, in the generated optical pulse trains from the RHML-FRL implementing the present invention.
Figure 11A:
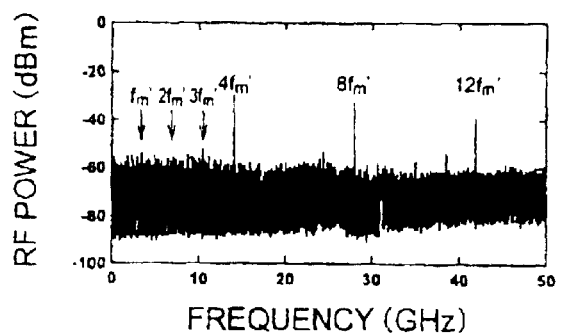
FIG. 11A shows electrical spectrum of detected optical trains from the conventional RHML-FRL without the present invention.
Figure 11B:
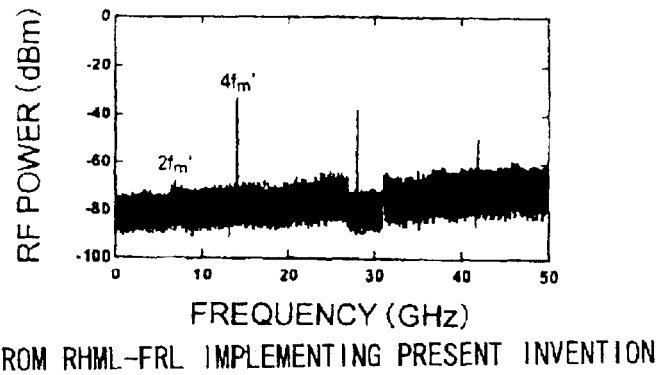
FIG. 11B shows electrical spectrum of detected optical pulse trains from RHML-FRL implementing present invention.
Figure 11C:
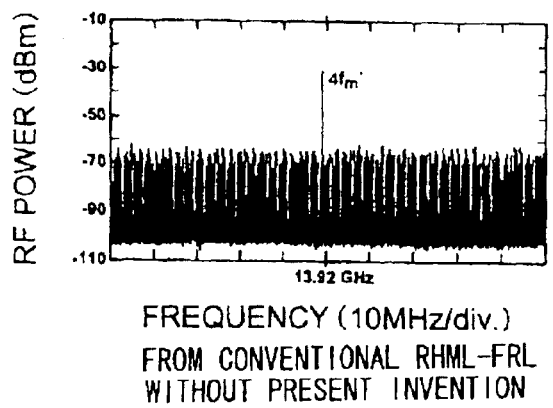
FIG. 11C shows electrical spectrum of detected optical trains from the conventional RHML-FRL without the present invention.
Figure 11D:
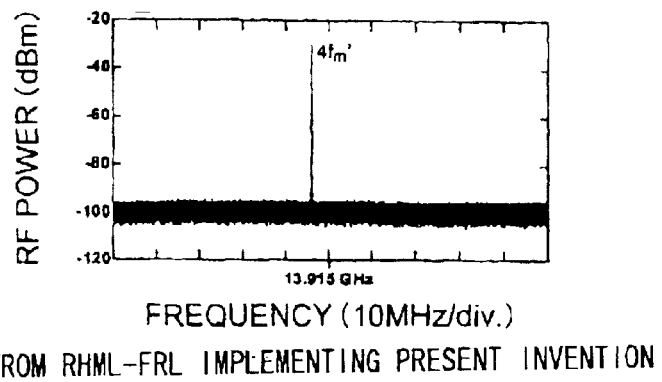
FIG. 11D shows electrical spectrum of detected optical pulse trains from RHML-FRL implementing present invention.
Figure 12:
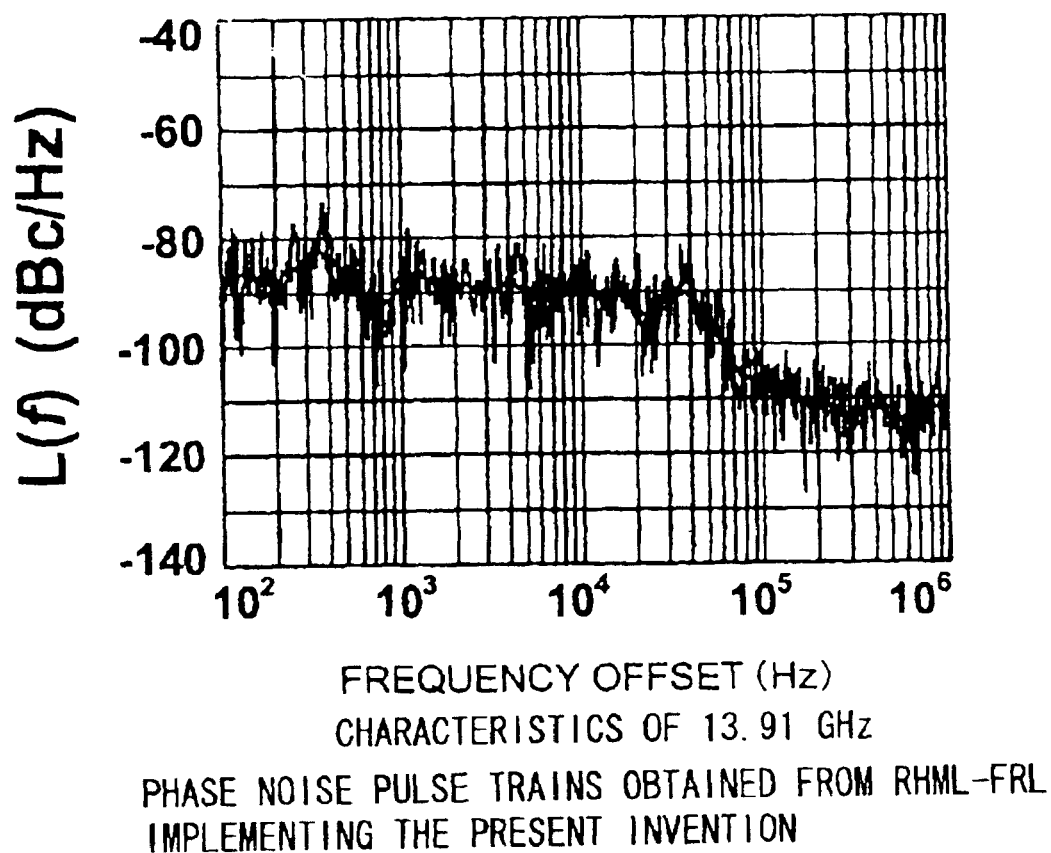
FIG. 12 shows phase noise characteristic of 13.91 GHz optical pulse trains obtained from the RHML-FRL implementing the present invention.

In order to demonstrate the new pulse amplitude stabilization method in RHML-FRL, a conventional RHML-FRL (see FIG. 14A) which did not implement the present invention and of which cavity length corresponds to $f_c$=3.68 MHz was first set up. In the following, FIGS. 6A–12 show the experimental results. FIGS. 6A and 6B show close in view of optical pulse and an optical pulse spectrum and auto correlation pulse profile of trains of 4 fm' obtained from the conventional RHML-FRL. In FIG. 6B an optical pulse train of 13.91 GHz was observed on a sampling oscilloscope Tektronics CSA803 with sampling head SD-26 (17.6 ps rise time). FIGS. 7A and 7B show optical spectrum and the autocorrelator pulse profile of the generated optical pulse trains in conventional RHML-FRL. FIGS. 8A and 8B show close-in view of optical pulse and corresponding pulse trains with a repetition frequency of 4 fm' obtained from RHML-FRL implementing the present invention. FIGS. 9A and 9B show optical spectrum and autocorrelator pulse profile of the generated optical pulse trains in RHML-FRL incorporating the present invention. FIG. 10 shows variation of the measured full width at a half maximum pulse width and a time—band products with changes in operating wavelengths. FIGS. 11A and 11C show electrical spectrum generated of the optical pulse trains in the conventional RHML-FRL, while FIG. 11B and FIG. 11D show the corresponding electrical spectrum of the optical pulse trains from the RHML-FRL implementing the present invention. FIG. 12 shows pulse noise characteristic of 13.91 GHz pulse trains generated from the RHML-FRL implementing the present invention.

The experiment was implemented in a case where pulse amplitude stabilisation method is incorporated and in the case without the pulse amplitude stabilisation method while maintaining the same cavity length corresponding to $f_c$=3.68 MHz. The average optical power inside the cavity was 30 mW. A +25 dBm modulation signal at 3476.918 MHz which is approximately a $945^{th}$ harmonic of $f_c$ was applied to the MZM biased at the quadrature point and generated optical pulses at a repetition frequency of 3.477 GHz. The $f_{m'}$ was then detuned by 0.92 MHz ($f_c/4$, p=4) and a 13.91 GHz optical pulse train was obtained via rational harmonic mode-locking.

A close-in-view of the 13.91 GHz pulses shown in FIG. 6B reveals a large amplitude noise while FIG. 6B shows a significant inequality in the pulse amplitudes in the generated optical pulse trains caused by the random oscillation of the intermediate modes at $f_m$, $2f_m$, and $3f_m$, which is typical in a conventional RHML-FRL. FIG. 7A shows the presence of these strong intermediate modes in the optical spectrum of the 13.91 GHz pulse trains in the conventional RHML-FRL measured by using a high resolution optical spectrum analyser (resolution bandwidth of 0.01 nm). The spectral width of optical spectrum was 0.223 nm. Assuming a $\text{sech}^2$ pulse shape the FWHM pulsewidth measured via a SHG autocorrelator was 15.48 ps as shown in FIG. 7B resulting into a time-bandwidth product of 0.43.

The modulation signal power was further increased to +31 dBm and the MZM was biased at its maximum transmission point resulting in the generation of even-order modulation sidebands at ($f_0 \pm 2 f_m'$), ($f_0 \pm 4 f_m'$), etc. with suppressed carrier as well as odd-order sidebands at ($f_0 \pm f_m'$), ($f_0 \pm 3 f_m'$), etc. as described above. It was observed that the pulse amplitude instability was significantly reduced which is mainly due to further suppression of intermediate modes which are frequency spaced at $f_m'$, $2f_m'$, $3f_m'$, and the generation of the $2^{nd}$-order modulation sidebands at ($f_0 \pm 2f_m'$) resulting in corresponding increase in energy in the main oscillating fourth-order modes which are separated by $4f_{m'}$. However it was noticed that the pulses were still suffering with a certain amount of amplitude instability which suggests that the intermediate modes were still strong enough to contribute to pulse amplitude instability. In order to further enhance the laser excitation of $4^{th}$-order modes and thereby realising the increased suppression of intermediate modes, a FFP with FSR=$f_{m'}$ as shown in FIG. 5A is introduced. The cavity length was adjusted to maintain $f_c$=3.68 MHz and the average optical power inside the cavity were kept constant to 30 mW. A modulation signal of ±31 dBm power at 3477.11 MHz was applied to the MZM which was biased at its maximum transmission point and successfully generated equal amplitude pulse trains with repetition frequency of 4 $f_{m'}$=13.91 GHz as shown in FIGS. 8A and 8B. It can be seen from the figures that the generated optical pulses exhibit high stability in terms of amplitude noise and pulses were equal in amplitudes. This indicates that the intra-cavity optical filtering has effectively increased the energy in $4^{th}$-order modes while suppressing oscillations of the intermediate modes to the extent that their contribution to pulse amplitude instability almost became negligible.

The measured optical spectrum of 13.91 GHz pulse train is shown in FIG. 9A. As one can see from the figure that the dominant modes were separated by 13.91 GHz while the intermediate modes at $f_m$, $2 f_m$, and $3 f_m$, were highly suppressed and the measured spectral width was 0.177 nm. Assuming a $\text{Sech}^2$ pulse shape, FWHM pulsewidth of 17.42 ps was measured via SHG Autocorrelator and is shown in FIG. 9B which results into a time-bandwidth product of 0.38.

This indicates that the generated optical pulses were close to transform-limited. The wavelength tunability of the laser by changing its operating wavelength via an optical band-pass filter with a tuning range of 1535–1565 nm was investigated. FIG. 10 shows the experimental result of relations between wavelength and pulse width and between wavelength and time-bandwidth product.

In the 1535–1565 nm wavelength region, pulsewidth remained within 17.42-19.35 ps range and pulses remained close to transform-limited with time-bandwidth products of 0.38–0.39 were observed as shown in FIG. 10.

The electrical spectra of the detected optical pulse trains from the conventional RHML-FRL were measured using a high-speed 45 GHz photodetector in conjunction with a millimetre-wave spectrum analyser and compared with the corresponding electrical spectra of the pulse trains from the laser when the new optical pulse amplitude stabilization method was applied.

FIGS. 11A, 11B, 11C and 11D show the electrical spectra of the detected 13.91 GHz optical pulse trains from the two lasers. FIGS. 11A and 11C show the electrical spectra of optical pulse train obtained from the conventional RHML-FRL, while FIGS. 11B and 11D are the corresponding electrical spectra of the detected pulse trains from the RHML-FRL implementing the present invention.

It can be seen from FIG. 11A that in the conventional RHML-FRL, harmonics of the applied modulation frequency at 3477.111 MHz were suppressed in the range of 23–25 dB relative to the harmonics of the pulse repetition frequency of 13.91 GHz while FIG. 11B shows that in the corresponding RF spectrum from the RHML-FRL under pulse amplitude stabilization, the frequency components at $f_m'$, $3f_{m'}$ etc. were completely eliminated and the $2f_{m'}$, $6 f_{m'}$, etc. frequency components were suppressed by more than 35 dB relative to the harmonic components of 13.91 GHz pulse repetition frequency. These measurements show the successful implementation of the new pulse amplitude stabilization technique in RHML-FRL. In addition, FIGS. 11C and 11D reveal that under pulse amplitude stabilization the super-mode noise was significantly reduced from 33 dB to 65 dB confirming a high degree of amplitude noise stability achieved via this technique.

The spectral purity in terms of amplitude noise and phase noise or timing jitter in 13.91 GHz optical pulse train was further investigated using spectral domain technique. It was observed that in the measured single sideband noise spectral power density distribution L(f), optical pulses from the conventional RHML-FRL exhibit a phase noise of −84.67 dBc/Hz, and −104.49 dBc/Hz at 10 kHz and 100 kHz offset frequencies from the 13.91 GHz carrier while under pulse amplitude stabilization, the phase noise was significantly reduced to −89 dBc/Hz, and −107.22 dBc/Hz at the corresponding offset frequencies, respectively. For comparison, phase noise from the drive electronics was measured as −98.67 dBc/Hz, and −108 dBc/Hz at 10 kHz and 100 kHz offset frequencies, respectively, from the 3.477 GHz carrier. FIG. 12 shows the L(f) distribution of the 13.91 GHz optical pulse trains from the RHML-FRL with pulse amplitude stabilization.

The total pulse noise which includes both amplitude noise and phase noise was measured from the integrated L(f) distribution for the fundamental frequency component at 13.91 GHz over a large offset frequency range of 100 Hz-1 MHz from the carrier. From the measured total pulse noise data, a low amplitude noise of 0.5% and a timing jitter of 0.44 ps were estimated. Typically, the timing jitter is calculated from the measured phase noise at large harmonic numbers where phase noise is dominant. However higher harmonics of 13.91 GHz repetition frequency could not be detected beyond 50 GHz due to the limited bandwidth of the detecting instruments. The low amplitude noise, phase noise, and timing jitter confirm the excellent spectral purity of the generated 13.91 GHz optical pulse trains which is attributed to the intra-cavity optical filtering in conjunction with the generation of $2^{nd}$-order modulation sidebands with suppressed carrier as well as odd-order sidebands.

FIG. 13A shows the preferred embodiment 2 for implementing the present invention, which shows a case using a semiconductor optical amplifier as the optical amplifier. FIG. 13B shows an optical pulse train of the present invention. Reference numeral 18 is a power source, which supplies excitation current to the semiconductor optical amplifier. In the system of FIG. 13A, the semiconductor optical amplifier (SOA) generates and amplifies the laser beam. As the result, frequencies of integer multiple of the cavity resonance frequency are generated. A modulation signal $f_m$ which is further detuned by $\pm f_c/p$ is applied to the SOA to generate optical pulses with repetition frequency of $p(f_m \pm f_c/p)$ as mentioned above.

The many features and advantages of the present invention are apparent from the detailed specification and, thus, it is intended by the appended claims to cover all such features and advantages of the invention which fall within the true spirit and scope of the invention. Further, since numerous modification and changes will readily occur to those skilled in the art, it is not desired to limit the invention to the exact construction and operation illustrated and described, and accordingly all suitable modification and equivalents falling within the scope of the invention may be included in the present invention.

What is claimed is:

1. A stabilized optical pulse generator comprising:
   an optical fiber ring including
      optical fibers having a resonance frequency of $f_c$,
      an optical amplifier,
      a modulator for optical modulation which generates optical pulse trains of a repetition frequency $f_m$ when electric modulation signals of frequency of $f_m$ are applied thereto,
      an electric signal generator generating high frequency signals, and
      an optical pulse stabilizer which stabilizes the generated optical pulse trains by suppressing carrier components and some high frequency components of the optical pulse trains,
   wherein the generated optical pulse trains are of a repetition frequency of integer p times either $f_m+f_c/p$ or $f_m-f_c/p$, and
   wherein the generated optical pulse trains are detuned from the frequency fm by a frequency of the resonance frequency $f_c/p$.

2. The stabilized optical pulse generator of claim 1, wherein the stabilizer is a Fabry-Perot filter.

3. The stabilized optical pulse generator of claim 2, wherein, for fm' which is $f_m+f_c/p$ or $f_m-f_c/p$, a distance of a free spectrum range of the Fabry-Perot filter is fm or K $f_m$, or $f_m$' or K $f_m$', K being an integer.

4. The stabilized optical pulse generator of claim 1, wherein the modulator is a Mach-Zehnder optical intensity modulator biased with a maximum transmission voltage, the modulator generating an optical pulse train of repeating frequency of an even number times the applied modulation frequency.

5. The stabilized optical pulse generator of claim 1, wherein, for P=4, the repeating frequency is $4(f_m+f_c/4)$ or $4(f_m-f_c/4)$.

6. The stabilized optical pulse generator of claim 1, wherein p is 4.

7. The stabilized optical pulse generator of claim 1, wherein the optical amplifier includes optical fibers having specified amplification characteristics and an excitation light source.

8. The stabilized optical pulse generator of claim 1, wherein the optical fibers are doped with a rare earth element.

9. The stabilized optical pulse generator of claim 1, wherein the optical amplifier is a Raman amplifier.

10. The stabilized optical pulse generator of claim 1, wherein the optical amplifier includes a semiconductor laser amplifier and a power source of excitation current.

11. A stabilized optical pulse generator comprising:
    an optical fiber ring including
       optical fibers,
       an optical amplifier,
       a modulator for optical modulation which generates optical pulse trains of a repetition frequency $f_m$ when electric modulation signals are applied thereto,
       an electric signal generator generating high frequency signals, and
       an optical pulse stabilizer which stabilizes the generated optical pulse trains by suppressing carrier components and some high frequency components of the optical pulse trains,
    wherein the modulator modulates the applied electrical signals to generate the optical pulse trains, the frequency of the applied electrical signal being detuned from, and being a fraction of, a resonant frequency of the optical fiber ring, and
    wherein $f_m$ is an integer multiple of the applied electrical signal.

12. A stabilized optical pulse generator of claim 11, wherein the optical amplifier includes optical fibers having specified optical amplification characteristics, and an excitation light source.

13. A stabilized optical pulse generator in claim 12, wherein the optical fibers are doped with a rare earth element.

14. A stabilized optical pulse generator in claim 12, wherein the optical amplifier is a Raman amplifier.

15. A stabilized optical pulse generator in claim 11, wherein the optical amplifier includes a semiconductor laser amplifier and a power source of excitation current.

16. A stabilized optical pulse generator comprising:
- an optical fiber ring including
  - optical fibers,
  - an optical amplifier,
  - a modulator for optical modulation which generates optical pulse trains when electric modulation signals are applied thereto, and
  - an optical pulse stabilizer which includes a Fabry-Perot filter and stabilizes the generated optical pulse trains by suppressing carrier components and some high frequency components of the optical pulse trains,
- wherein the generated optical pulse train has a repeating frequency of $f_m$,
- wherein the electric signals applied to the modulator are of the frequency $f_m$, and
- wherein the modulator modulates the applied electrical signals to generate the optical pulse trains, the frequency of the applied electrical signal being detuned from, and being a fraction of, a resonant frequency of the optical fiber ring.

17. A stabilized optical pulse generator of claim 16, wherein the optical amplifier includes optical fiber having specified optical amplification characteristics, and an excitation light source.

18. A stabilized optical pulse generator in claim 16, wherein the optical amplifier includes a semiconductor laser amplifier and a power source of excitation current.

19. A stabilized optical pulse generator comprising:
- an optical fiber ring including
  - optical fibers,
  - an optical amplifier,
  - a Mach-Sender optical intensity modulator which generates optical pulse trains of a repetition frequency $f_m$ when electric modulation signals of frequency of fm are applied thereto,
  - an electric signal generator generating high frequency signals, and
  - an optical pulse stabilizer which stabilizes the generated optical pulse trains by suppressing carrier components and some high frequency components of the optical pulse trains,
- wherein the modulator modulates the applied electrical signals to generate the optical pulse trains, the frequency of the applied electrical signal being detuned from, and being a fraction of, a resonant frequency of the optical fiber ring, and
- wherein $f_m$ is an integer multiple of the applied electrical signal.

20. A stabilized optical pulse generator of claim 19, wherein the optical amplifier includes optical fibers having specified optical amplification characteristics, and an excitation light source.

21. A stabilized optical pulse generator in claim 19, wherein the optical amplifier includes a semiconductor laser amplifier and a power source of excitation current.

22. A stabilized optical pulse generator comprising:
- an optical fiber ring including
  - optical fibers,
  - an optical amplifier,
  - a Mach-Zehnder optical intensity modulator which generates optical pulse trains of a repetition frequency $f_m$ when electric modulation signals of frequency of fm are applied thereto,
  - an electric signal generator generating high frequency signals, and
  - an optical pulse stabilizer which includes a Fabry-Perot filter and stabilizes the generated optical pulse trains by suppressing carrier components and some high frequency components of the optical pulse trains,
- wherein the modulator modulates the applied electrical signals to generate the optical pulse trains, the frequency of the applied electrical signal being detuned from the repetition frequency fm and being a fraction of a resonant frequency of the optical fiber ring, and
- wherein $f_m$ is an integer multiple of the applied electrical signal.

23. A stabilized optical pulse generator of claim 22, wherein the optical amplifier includes optical fibers having optical amplification characteristics, and an excitation light source.

24. A stabilized optical pulse generator in claim 22, wherein the optical amplifier includes a semiconductor laser amplifier and a power source of excitation current.

* * * * *

UNITED STATES PATENT AND TRADEMARK OFFICE
CERTIFICATE OF CORRECTION

PATENT NO.        : 6,957,019 B2
APPLICATION NO.   : 10/147986
DATED             : October 18, 2005
INVENTOR(S)       : Kamal Kant Gupta et al.

It is certified that error appears in the above-identified patent and that said Letters Patent is hereby corrected as shown below:

Title Page, Column 1 (Other Publications), Line 3, after "2001" insert - - , - -.
      Column 1 (Other Publications), Line 4, after "vol. 37" insert - - , - -.
      Column 2 (Other Publications), Lines 5-6 delete "Multoplication" and insert - - Multiplication - - therefor.
      Column 2 (Other Publications), Line 7, delete "Eing" and insert - - Ring - - therefor.
Column 15, Line 38, delete "Mach-Sender" and insert - - Mach-Zehnder - - therefor.

Signed and Sealed this

Eighth Day of August, 2006

JON W. DUDAS
*Director of the United States Patent and Trademark Office*